United States Patent
Kikuchi et al.

(10) Patent No.: US 10,249,020 B2
(45) Date of Patent: Apr. 2, 2019

(54) IMAGE PROCESSING UNIT, IMAGING DEVICE, COMPUTER-READABLE MEDIUM, AND IMAGE PROCESSING METHOD

(71) Applicants: TOKYO INSTITUTE OF TECHNOLOGY, Meguro-ku, Tokyo (JP); OLYMPUS CORPORATION, Hachioji-shi, Tokyo (JP)

(72) Inventors: Sunao Kikuchi, Tokyo (JP); Yusuke Monno, Tokyo (JP); Daisuke Kiku, Tokyo (JP); Masayuki Tanaka, Tokyo (JP); Masatoshi Okutomi, Tokyo (JP)

(73) Assignees: TOKYO INSTITUTE OF TECHNOLOGY, Meguro-ku, Tokyo (JP); OLYMPUS CORPORATION, Hachioji-shi, Tokyo (JP)

( * ) Notice: Subject to any disclaimer, the term of this patent is extended or adjusted under 35 U.S.C. 154(b) by 0 days.

(21) Appl. No.: 15/479,322

(22) Filed: Apr. 5, 2017

(65) Prior Publication Data
US 2017/0206631 A1    Jul. 20, 2017

Related U.S. Application Data

(63) Continuation of application No. PCT/JP2014/005392, filed on Oct. 23, 2014.

(51) Int. Cl.
*G06T 3/40*    (2006.01)
*G06T 5/20*    (2006.01)
(Continued)

(52) U.S. Cl.
CPC .............. *G06T 3/4007* (2013.01); *G06T 5/20* (2013.01); *H04N 5/23229* (2013.01);
(Continued)

(58) Field of Classification Search
CPC ......... G06T 3/4007; G06T 5/20; H04N 5/235; H04N 7/183; H04N 5/23229; H04N 5/23232; H04N 9/045
(Continued)

(56) References Cited

U.S. PATENT DOCUMENTS 9,344,614 B2 * 5/2016 Kikuchi ................. H04N 5/232
   348/46
9,843,782 B2 * 12/2017 Kikuchi ................. H04N 9/646
   382/167
(Continued)

FOREIGN PATENT DOCUMENTS

JP    2007068126 A    3/2007
JP    2011041208 A    2/2011
(Continued)

OTHER PUBLICATIONS

Jan. 13, 2015, International Search Report issued in the International Patent Application No. PCT/JP2014/005392.
(Continued)

*Primary Examiner* — Marly S Camargo
(74) *Attorney, Agent, or Firm* — Kenja IP Law PC

(57) ABSTRACT

An image processing unit has an image acquisition part, a correlation determination part, a reference image generation part, and an interpolation image generation part. The image acquisition part acquires an original image. The correlation determination unit determines whether the correlation of an image component of a primary reference band with image components of respective bands other than the primary reference band is either high correlation or low correlation. The reference image generation part interpolates missing pixels in the image component of the primary reference band by switching the interpolation method based on the correlation determination result obtained by the correlation determination part. The interpolation image generation part inter-
(Continued)

polates, using the correlation determination result and the primary reference image, missing pixels in at least some of the image component of the primary reference band.

17 Claims, 11 Drawing Sheets

(51) Int. Cl.
  *H04N 5/232* (2006.01)
  *H04N 5/235* (2006.01)
  *H04N 9/04* (2006.01)
  *H04N 9/07* (2006.01)
  *H04N 7/18* (2006.01)

(52) U.S. Cl.
  CPC ......... *H04N 5/23232* (2013.01); *H04N 7/183* (2013.01); *H04N 9/045* (2013.01); *H04N 9/07* (2013.01)

(58) Field of Classification Search
  USPC ............... 348/222.1, 538, E13.065, E7.012; 382/278, 300, 165, 162, 167, 254, 275
  See application file for complete search history.

(56) References Cited

U.S. PATENT DOCUMENTS

| | | | | |
|---|---|---|---|---|
| 2006/0050956 A1* | 3/2006 | Tanaka | ................... | H04N 9/045 |
| | | | | 382/162 |
| 2014/0072214 A1* | 3/2014 | Tanaka | ..................... | H04N 9/04 |
| | | | | 382/165 |
| 2015/0070533 A1* | 3/2015 | Kikuchi | ................... | H04N 9/76 |
| | | | | 48/272 |

FOREIGN PATENT DOCUMENTS

| | | |
|---|---|---|
| JP | 2012239038 A | 12/2012 |
| JP | 2014146872 A | 8/2014 |

OTHER PUBLICATIONS

Mar. 8, 2018, Office Action issued by the State Intellectual Property Office in the corresponding Chinese Patent Application No. 201480082798.7.

Jul. 31, 2018, Office Action issued by the State Intellectual Property Office in the corresponding Chinese Patent Application No. 201480082798.7.

* cited by examiner

FIG. 2

| | | | |
|---|---|---|---|
| C2 | C1 | C3 | C1 |
| C1 | C4 | C1 | C5 |
| C3 | C1 | C2 | C1 |
| C1 | C5 | C1 | C4 | row direction →
column direction ↓

FIG. 6

IMAGE PROCESSING UNIT, IMAGING DEVICE, COMPUTER-READABLE MEDIUM, AND IMAGE PROCESSING METHOD

CROSS REFERENCE TO RELATED APPLICATION

The present application is a Continuing Application based on International Application PCT/JP2014/005392 filed on Oct. 23, 2014, the entire disclosures of which is incorporated herein by reference.

TECHNICAL FIELD

The present disclosure relates to an image processing unit, an imaging device, a computer-readable medium, and an image processing method, for improving sense of resolution in multi-band images.

BACKGROUND

Digital cameras typically use a single-chip imaging device and a color filter array (CFA), which means that the color filter array (CFA) may be multi-banded to enhance color reproducibility. However, the increase in the number of bands reduces sample density in each single band, which may lead to false colors to be generated upon demosaicing.

In view of the above, there has been proposed a system of referencing, among image components of a plurality of bands constituting a multi-band original image, an image component of bands capable of obtaining high-frequency components with high precision, so as to generate an interpolation image of image components from other bands (see Patent Literature (PTL) 1).

CITATION LIST

Patent Literature

PTL 1: JP 2012-239038 A

SUMMARY

Technical Problem

However, the interpolation process of PTL 1 generates an interpolation image of image components in other bands using a reference image obtained by interpolating missing pixels in an image component of a band to be referenced. Thus, the sense of resolution of image components in the other bands, i.e., the reproducibility of the image, could vary depending on the sense of resolution of the reference image, as to which further improvement has been required.

It could therefore be helpful to provide an image processing unit, an imaging device, a computer-readable medium, and an image processing method, as disclosed herein, for generating an interpolation image improved in the sense of resolution, based on an original image generated by an image sensor having a multi-band filter array.

Solution to Problem

In light of the above, an image processing unit disclosed herein includes:
an image acquisition part that acquires an original image captured by an image sensor having a multi-band filter array including filters of four or more bands arranged in an array, the filters including a filter of a primary reference band as an arbitrary band;
a correlation determination part that determines whether correlation of an image component of the primary reference band with image components of respective bands other than the primary reference band is either of high correlation or low correlation;
a reference image generation part that interpolates missing pixels in the image component of the primary reference band by switching the interpolation method based on the correlation determination result obtained by the correlation determination part, to thereby generate a primary reference image; and
an interpolation image generation part that interpolates missing pixels in at least part of the image components of respective bands other than the primary reference band, using the correlation determination result and the primary reference image.

In the disclosed image processing unit, the reference image generation part may preferably use an image component of at least one band determined as being of the high correlation to interpolate missing pixels in the an image component of the primary reference band.

In the disclosed image processing unit, the reference image generation part may preferably calculate, at a pixel position where an image component of a band determined as being of high correlation each have a pixel value, an interpolated value of the pixel position in the image component of the primary reference band using the correlation with the image component of the band.

In the disclosed image processing unit, the reference image generation part may preferably calculate, at a pixel position where an image component of a band determined as being of the low correlation each have a pixel value, an interpolated value of the pixel position in the image component of the primary reference band, using the correlation with an image component of at least one band determined as being of high correlation.

In the disclosed image processing unit, the reference image generation part may preferably calculates, at a pixel position where the image component of a band determined as being of the low correlation each have a pixel value, a plurality of interpolated values at the pixel position in the image component of the primary reference band, using the correlation with respective image components of a plurality of bands determined as being of the high correlation, and calculates the weighted mean value of the plurality of interpolated values as the interpolated value at the pixel position in the image component of the primary reference band.

In the disclosed image processing unit, the reference image generation part may preferably calculate, at a pixel position where the image component of a band determined as being of the low correlation each have a pixel value, an interpolated value of the pixel position in the image component of the primary reference band, using the correlation with an image component of a single band determined as being of the high correlation.

In the disclosed image processing unit, the reference image generation part may preferably calculate, at a pixel position where the image component of a band determined as being of the low correlation each have a pixel value, an interpolated value of the pixel position in the image component of the primary reference band, through interpolation process using at least one of the pixel values constituting the image component of the primary reference band other than the pixel position and the interpolated value calculated based on the correlation with the image component of at least one band determined as being of the high correlation.

In the disclosed image processing unit, the reference image generation part may preferably calculate interpolated values of the image component of the primary reference band for each direction.

In the disclosed image processing unit, the correlation determination part may preferably determine, based on correlation information defined in advance, whether the correlation is either of high correlation or low correlation.

In the disclosed image processing unit, the correlation information may preferably be defined in advance based on one of: analysis of data on plurality of arbitrary images and a spectral sensitivity characteristic of the multi-band filter array.

In the disclosed image processing unit, the correlation determination part may preferably generate correlation information based on the original image and determines, based on the correlation information, whether the correlation is either of high correlation or low correlation.

In the disclosed image processing unit, the correlation information may preferably be scenes determined based on the original image.

In the disclosed image processing unit, the correlation information may preferably be calculated from either: a difference of the sum total, the mean value, the variance, the maximum value, and the median of the pixel values between image components of bands constituting the original image; or a difference between the interpolated value of the image component of the primary reference band based on a pixel value constituting an image component of a band other than the primary reference band and a pixel value constituting the image component of the primary reference band.

In the disclosed image processing unit, the correlation determination part may preferably generate the correlation information for each of partial regions obtained by dividing the original image into a plurality of regions, and determines, for each of the partial regions, whether the correlation is either of high correlation or low correlation.

In the image processing unit, the interpolation image generation part may preferably use the primary reference image to interpolate missing pixels in an image component of a band determined as being of the high correlation.

In the disclosed image processing unit, the interpolation image generation part may preferably interpolate missing pixels in an image component of a band, among image components of a plurality of bands determined as being of the high correlation, the band having lower correlation with the image component of the primary reference band than with image components of other bands while having correlation with the image components of the other bands, by using, as a secondary reference image, an interpolation image obtained by interpolating missing pixels in the image components of the other bands.

In the disclosed image processing unit, the interpolation image generation part may preferably interpolate missing pixels in an image component of the band determined as being of the low correlation, using the image component of the band.

An imaging device disclosed herein includes:
an image sensor that has a multi-band filter array having filters of four or more bands arranged in an array, the filters including a filter of a primary reference band as an arbitrary band;
a correlation determination part that determines whether correlation of an original image captured by the image sensor with an image component of the primary reference band and with image components of respective bands other than the primary reference band is either of high correlation or low correlation;
a reference image generation part that interpolates missing pixels in the image component of the primary reference band by switching the interpolation method based on the correlation determination result obtained by the correlation determination part, to thereby generate a primary reference image; and
an interpolation image generation part that interpolates missing pixels in at least some of the image components of respective bands other than the primary reference band, using the correlation determination result and the primary reference image.

The present disclosure, as has been explained as a device in the above, may also be implemented by a method, a program product, and a recording medium recording a program product, which thus should be understood as being encompassed by the scope of the disclosure.

For example, the present disclosure may be implemented as a not-transitory computer-readable medium storing an image processing program which causes a computer to function as:
a correlation determination part that determines whether correlation of an original image captured by an image sensor with an image component of a primary reference band and with image components of respective bands other than the primary reference band is either of high correlation or low correlation, the image sensor having a multi-band filter array having filters of four or more bands arranged in an array, the filters including a filter of a primary reference band as an arbitrary band;
a reference image generation part that interpolates missing pixels in the image component of the primary reference band by switching the interpolation method based on the correlation determination result obtained by the correlation determination part, to thereby generate a primary reference image; and
an interpolation image generation part that interpolates missing pixels in at least some of the image components of respective bands other than the primary reference band, using the correlation determination result and the primary reference image.

The present disclosure may also be implemented as an image processing method which includes:
causing an image sensor to capture an original image, the image sensor having a multi-band filter array having filters of four or more bands arranged in an array, the filters including a filter of a primary reference band as an arbitrary band;
determining whether correlation of the original image captured by the image sensor with an image component of a primary reference band and with image components of respective bands other than the primary reference band is either of high correlation or low correlation;
interpolating missing pixels in the image component of the primary reference band by switching the interpolation method based on the correlation determination result obtained by the correlation determination part, to thereby generate a primary reference image; and
interpolating, using the correlation determination result and the primary reference image, missing pixels in at least some of the image components of respective bands other than the primary reference band.

The disclosed image processing unit, imaging device, computer-readable medium, and image processing method configured as described above are capable of generating an interpolated image improved in the sense of resolution, based on an original image generated by an image sensor having a multi-band filter array.

BRIEF DESCRIPTION OF THE DRAWINGS

In the accompanying drawings:

FIG. 2 is a layout of filters in filter repeating units in a filter array of the image sensor of FIG. 1;

FIG. 6 is a process diagram showing processes of interpolating an image component of a primary reference band using a correlation interpolation image based on the second band to the fifth band, executed by the reference image generation part of FIG. 1;

DETAILED DESCRIPTION

Hereinafter, Embodiments disclosed herein will be illustrated with reference to the accompanying drawings.

Figure 1:
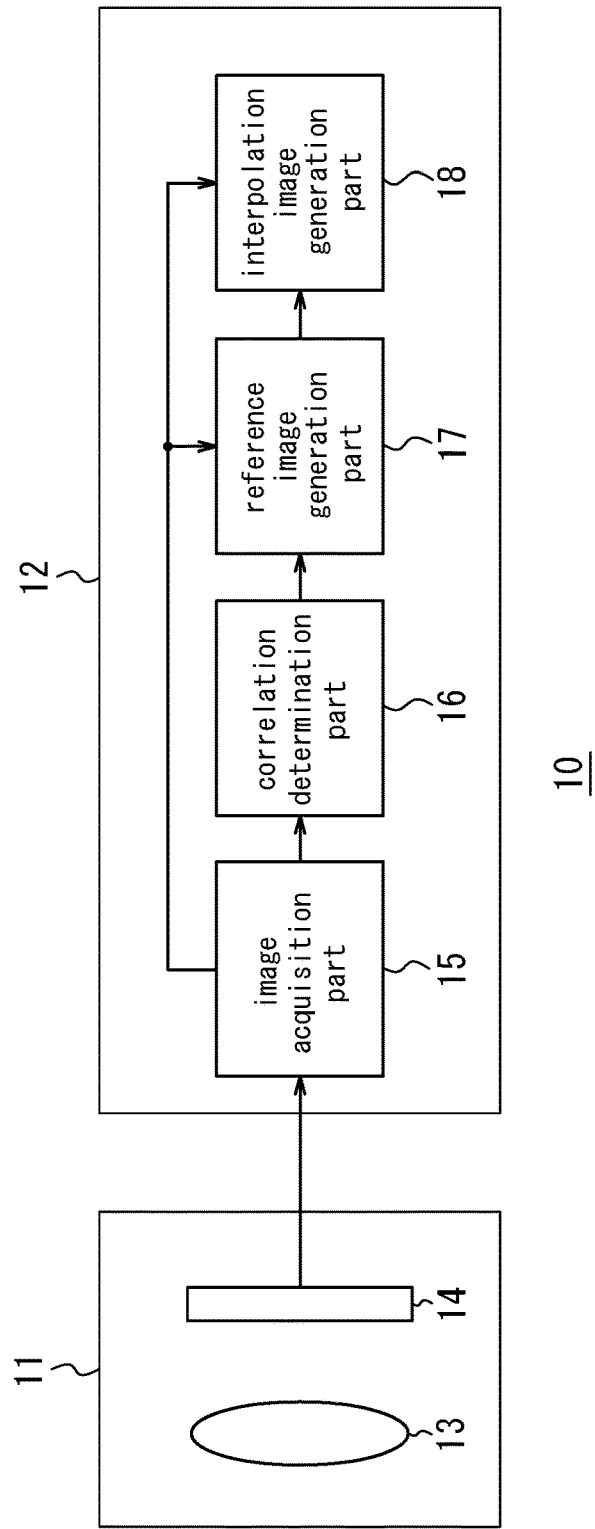
FIG. 1 is a functional block diagram illustrating a schematic configuration of the disclosed image processing unit according to Embodiment 1.

FIG. 1 is a functional block diagram illustrating a schematic configuration of the disclosed imaging device including an image processing unit, according to Embodiment 1.

The imaging device 10 is configured as, for example, a digital camera, a digital video camera, and a multifunctional terminal with camera, and includes an imaging section 11 and an image processing unit 12.

The imaging section 11 has an optical system 13 and an image sensor 14. The optical system 13 has at least one lens to form a subject image. The image sensor 14 is, for example, a CCD area sensor or a CMOS area sensor, and captures the subject image formed by the optical system 13 to generate an original image.

The image sensor 14 has a multi-band filter array including filters of four or more bands in an array on a light receiving surface. For example, in this embodiment, the multi-band filter array includes filters of five bands, including a first band, a second band, a third band, a fourth band, and a fifth band. An arbitrary band selected from among the filters of four or more bands is defined as a primary reference band corresponding to a primary reference band image for use in the interpolation process. Any band may arbitrarily be defined as the primary reference band, which however may preferably be a band of highest density. In this embodiment, the first band is defined as the primary reference band. Here, the filters may be, for example, a visibility filter such as RGB, an infrared filter, and an ultraviolet filter.

The filter array has, for example, a filter repeating unit of four rows and four columns illustrated in FIG. 2, and the filter repeating unit is repeatedly arranged in the column direction and the row direction. The filter repeating unit includes: eight of first filters C1 each corresponding to the first band; two of second filters C2 each corresponding to the second band; two of third filters C3 each corresponding to the third band; two of fourth filters C4 each corresponding to the fourth band; and two of fifth filters C5 each corresponding to the fifth band.

The first filter C1 is repeatedly arranged every other pixel in all the rows and columns. For example, starting from the upper left of FIG. 2 as a reference, the first filters C1 are each arranged in the second and fourth columns of the first and third rows, and the first filters C1 are each arranged in the first and third columns of the second and fourth rows.

Further, the rows and columns each having the first filter C1, the second filter C2, and the third filter C3 arranged side by side are each arranged every one pixel in the column direction and the row direction. For example, the second color filters C2 are each arranged in the first row first column and in the third row third column, and the third color filters C3 are each arranged in the first row third column and in the third row first column.

Further, the rows and columns each having the first filter C1, the fourth filter C4, and the fifth filter C5 arranged side by side are each arranged every one pixel in the column direction and the row direction. For example, the fourth color filters C4 are each arranged in the second row second column and in the fourth row fourth column, and the fifth color filters C5 are each arranged in the second row fourth column and in the fourth row second column.

Figure 3:
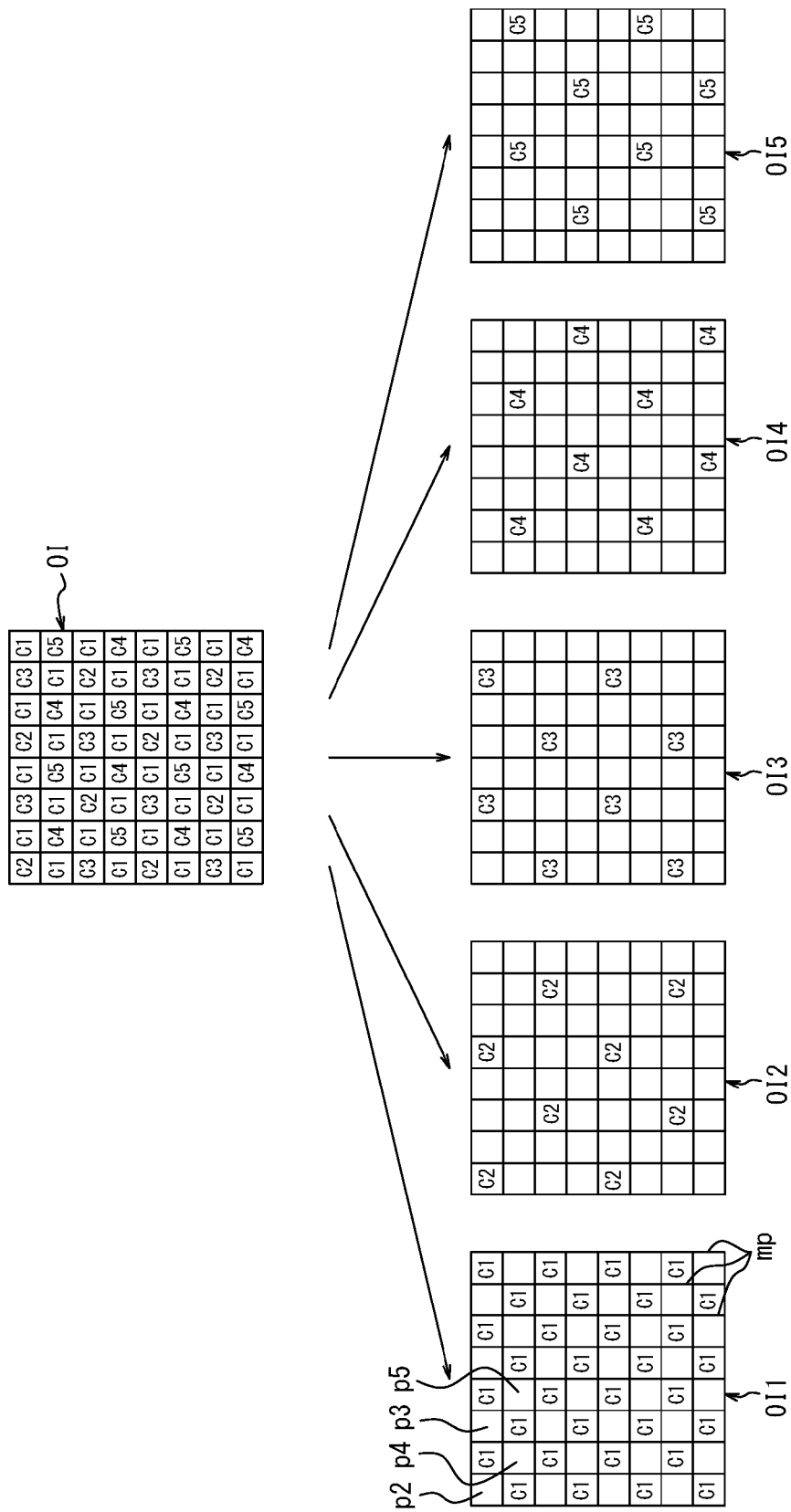
FIG. 3 shows how the first band image component to the fifth band image component are related to the original image captured by the image sensor of FIG. 1.

The image sensor 14 having the aforementioned filter array generates a pixel signal corresponding to the received amount of light according to the transmitted band. The image sensor 14 sequentially outputs pixel signals of all the pixels, which constitute an original image for one frame. The image sensor 14 then outputs, to the image processing unit 12, the original image thus formed, as an original image signal. Accordingly, each pixel in the original image has a pixel value of a single band alone, and thus, the original image OI may be decomposed, as illustrated in FIG. 3, into an image component OI1 of the first band, an image component OI2 of the second band, an image component OI3 of the third band, an image component OI4 of the fourth band, and an image component OI5 of the fifth band.

The image processing unit 12 is configured by including: an image acquisition part 15; a correlation determination part 16; a reference image generation part 17; and an interpolation image generation part 18 (see FIG. 1).

The image acquisition part 15 is, for example, an input terminal, to acquire the original image OI from the image sensor 14 and to transmit the image to the correlation determination part 16, the reference image generation part 17, and the interpolation image generation part 18.

The correlation determination part 16, the reference image generation part 17, and the interpolation image generation part 18 may each be configured as software to be executed on any suitable processor such as CPU (central processing unit), or as a dedicated processor specialized for each process, to provide functions explained in below.

The correlation determination part 16 calculates correlation of an image component of the primary reference band of the original image OI (the image component OI1 of the first band), with image components of other bands, that is, the image component OI2 of the second band, the image component OI3 of the third band, the image component OI4 of the fourth band, and the image component OI5 of the fifth band. Further, the correlation determination part 16 determines whether the correlation of the image component of the primary reference band (the image component OI1 of the first band) with image components of respective bands should be classified into either high correlation or low correlation.

Figure 4:
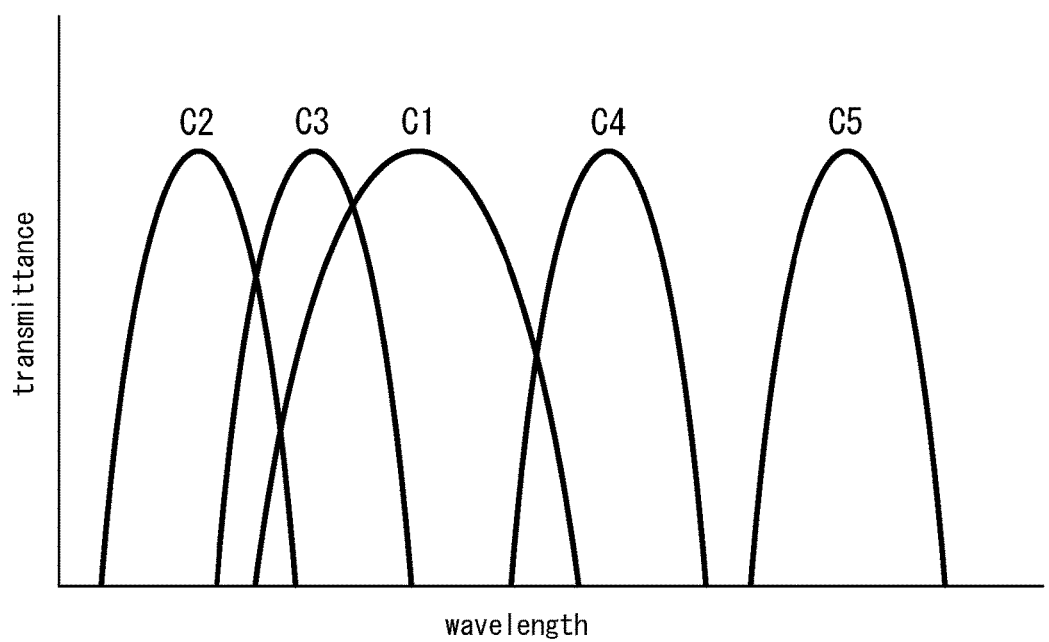
FIG. 4 is a graph showing a spectral transmittance of each filter constituting the filter array of the image sensor of FIG. 1.

The correlation determination part 16 determines, based on correlation information, whether the correlation of the image component of the primary reference band (the image component OI1 of the first band) with image components of respective bands is either high correlation or low correlation. In this embodiment, the correlation information refers to a correspondence table in which the correlation of the image component of the primary reference band with image components of the other bands is classified in advance into either high correlation or low correlation. The correlation may be classified into high correlation or low correlation, which may be defined based on, for example, the correlation between bands calculated through analysis of a plurality of arbitrary image data items. Alternatively, as illustrated in FIG. 4, the correlation may be defined based on the degree of overlap between the spectral sensitivities of the primary reference band and each of the other bands. In this embodiment, with respect to the image component of the primary reference band (the image component OI1 of the first band), the image component OI2 of the second band, the image component OI3 of the third band, and the image component OI4 of the fourth band are defined to be classified into high correlation while the image component OI5 of the fifth band are defined to be classified into low correlation.

Based on the correlation determination result obtained by the correlation determination part 16, that is, based on whether its being of either high correlation or low correlation, the reference image generation part 17 employs a different method to interpolate the missing pixels mp (see FIG. 3) in the image component of the primary reference band (the image component OI1 of the first band), to thereby generate a primary reference image.

At pixel positions p2, p3, p4, where the image component of a band determined as being of high correlation, namely, the image component OI2 of the second band, the image component OI3 of the third band, and the image component OI4 of the fourth band of this embodiment, each have a pixel value, the reference image generation part 17 uses the pixel value of the image components of respective bands to interpolate missing pixels mp in the image component of the primary reference band (the image component OI1 of the first band). At a pixel position p5, where the image component of a band determined as being of low correlation, namely, the image component OI5 of the fifth band of this embodiment has a pixel value, the reference image generation part 17 uses for interpolation the image components of bands determined as being of high correlation. In below, the method of interpolation is described in detail as to a pixel position where the image components of the bands determined as being of high correlation have a pixel value and a pixel position where an image component of a band determined as being of low correlation have a pixel value.

Figure 5:
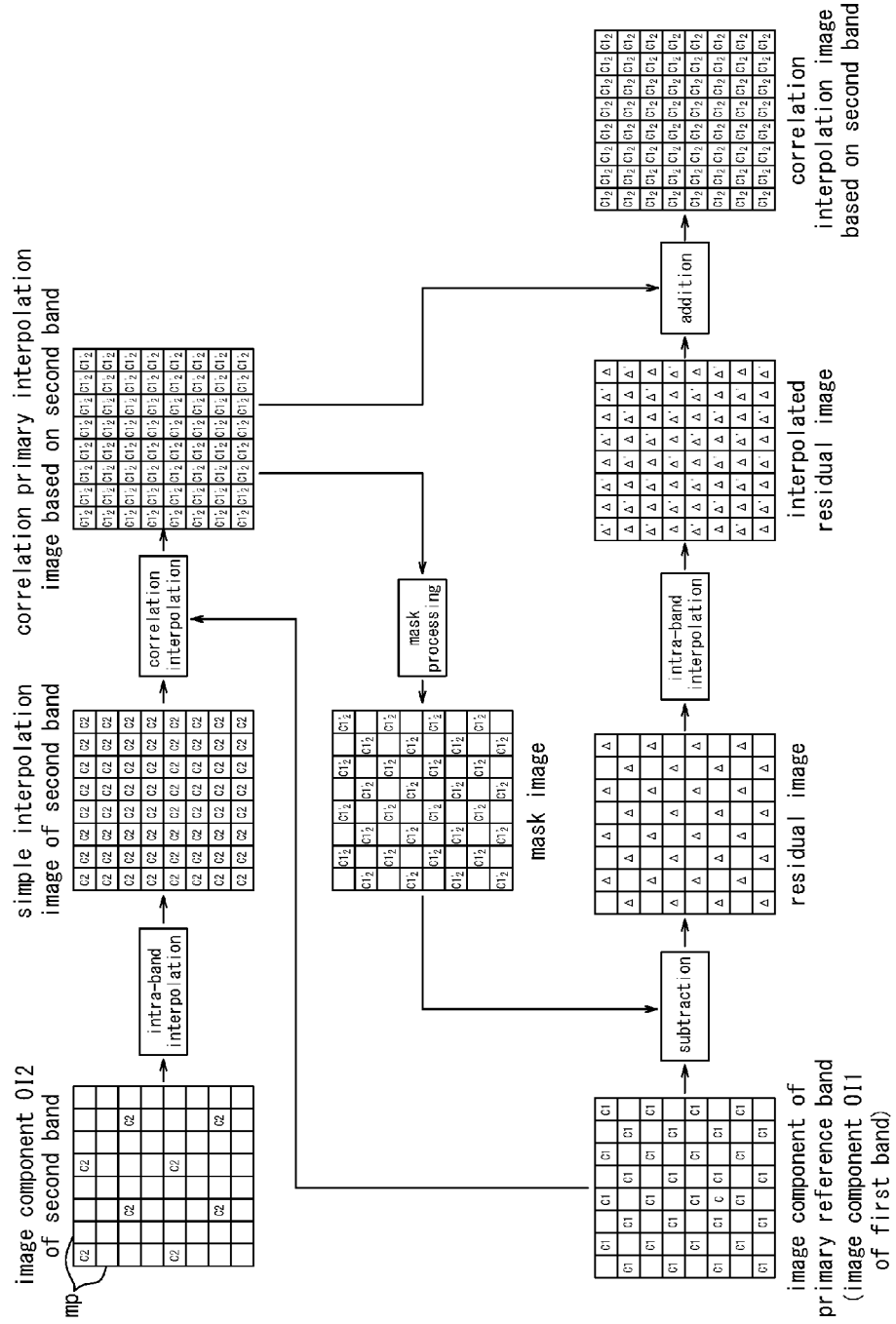
FIG. 5 is a process diagram showing processes of generating a correlation interpolation image based on a second band, executed by the reference image generation part of FIG. 1.

By taking as an example the image component OI2 of the second band, and with reference to FIG. 5, description is given of how to interpolate the image component of the primary reference band (the image component OI1 of the first band) relative to each of the pixel positions of the image components of the bands determined as being of high correlation. The reference image generation part 17 generates, within the image component OI2 of the second band, an interpolation image obtained by interpolating the missing pixels mp in the image component OI2 of the second band, through bi-linear interpolation and bi-cubic interpolation, as a simple interpolation image of the second band (see, 'intra-band interpolation' in the upper level).

Further, the reference image generation part 17 uses the correlation with the simple interpolation image of the second band and interpolates the image component of the primary reference band (the image component OI1 of the first band), to thereby generate a correlation primary interpolation image based on the second band (see 'correlated interpolation' in the upper level). Examples of the interpolation process using correlation may include, for example, guided filter processing. The guided filter processing is described in detail below. In the guided filter processing, the reference image generation part 17 designates, in order, all the pixels including the missing pixels mp in the image component of the primary reference band (the image component OI1 of the first band), as a pixel of interest. The reference image generation part 17 uses a simple interpolation image of the second band as a reference image, and calculates parameters $(a_{x_p}, b_{x_p})$ through a least squares method such that the cost function $E(a_{x_p}, b_{x_p})$ is minimized relative to the pixel of interest $x_p$.

$$E(a_{x_p}, b_{x_p}) = \sum_{x_i \in \omega_{x_p}} M_{x_i}\left((a_{x_p}I_{x_i} + b_{x_p} - p_{x_i})^2 + \varepsilon a_{x_p}^2\right) \quad (1)$$

In Expression (1), $a_{x_p}$, $b_{x_p}$ are parameters to be calculated. $\omega_{x_p}$ represents a peripheral pixel region, and $x_i$ represents a peripheral pixel included in the peripheral pixel region. $p_{x_i}$ represents a pixel value of the image component of the primary reference band. $M_{x_i}$ is a binary mask, which is 1 when the peripheral pixel has a signal component and 0 when the peripheral pixel has no signal component. $I_{x_i}$ represents an interpolation image for use in generating a reference image corresponding to the peripheral pixel, that is, a pixel value of a simple interpolation image of the second band. $\varepsilon$ represents a predetermined smoothing parameter.

When the parameters for all the pixels have been calculated, the reference image generation part 17 uses Expression (2) to calculate a correlation primary interpolation image based on the second band, that is, pixel values for all the pixels, based on the pixel value of the simple interpolation image of the second band.

$$q_{x_i} = \frac{1}{|\omega|} \sum_{x_p \in \omega_{x_i}} (a_{x_p}I_{x_p} + b_{x_p}) \quad (2)$$

In Expression (2), $\omega_{x_i}$ represents a peripheral pixel region, and $|\omega|$ represents the number of the pixels of interest and the peripheral pixels. ($a_{xp}$, $b_{xp}$) represent parameters calculated by Expression (1) for each pixel position of each pixel of interest.

Further, the reference image generation part 17 subjects the correlation primary interpolation image based on the second band to mask processing of masking pixels at the pixel positions of the missing pixels mp in the image component of the primary reference band (the image component OI1 of the first band), and calculates a mask image (see 'mask processing' in the middle level). Further, the reference image generation part 17 subtracts corresponding pixel values of the mask image from the pixel values of the image component of the primary reference band, to thereby generate a residual image (see "subtraction" in the lower level). Then, the reference image generation part 17 generates, within the residual image, a residual interpolation residual image in which the missing pixels mp in the residual image have been interpolated by, for example, bi-linear interpolation and bi-cubic interpolation (see 'intra-band interpolation' in the lower level). The reference image generation part 17 further adds corresponding pixel values of the correlation primary interpolation image based on the second band to the pixel values of the residual interpolation image, to thereby generate a correlation interpolation image based on the second band (see 'addition' in the lower level).

Figure 6:
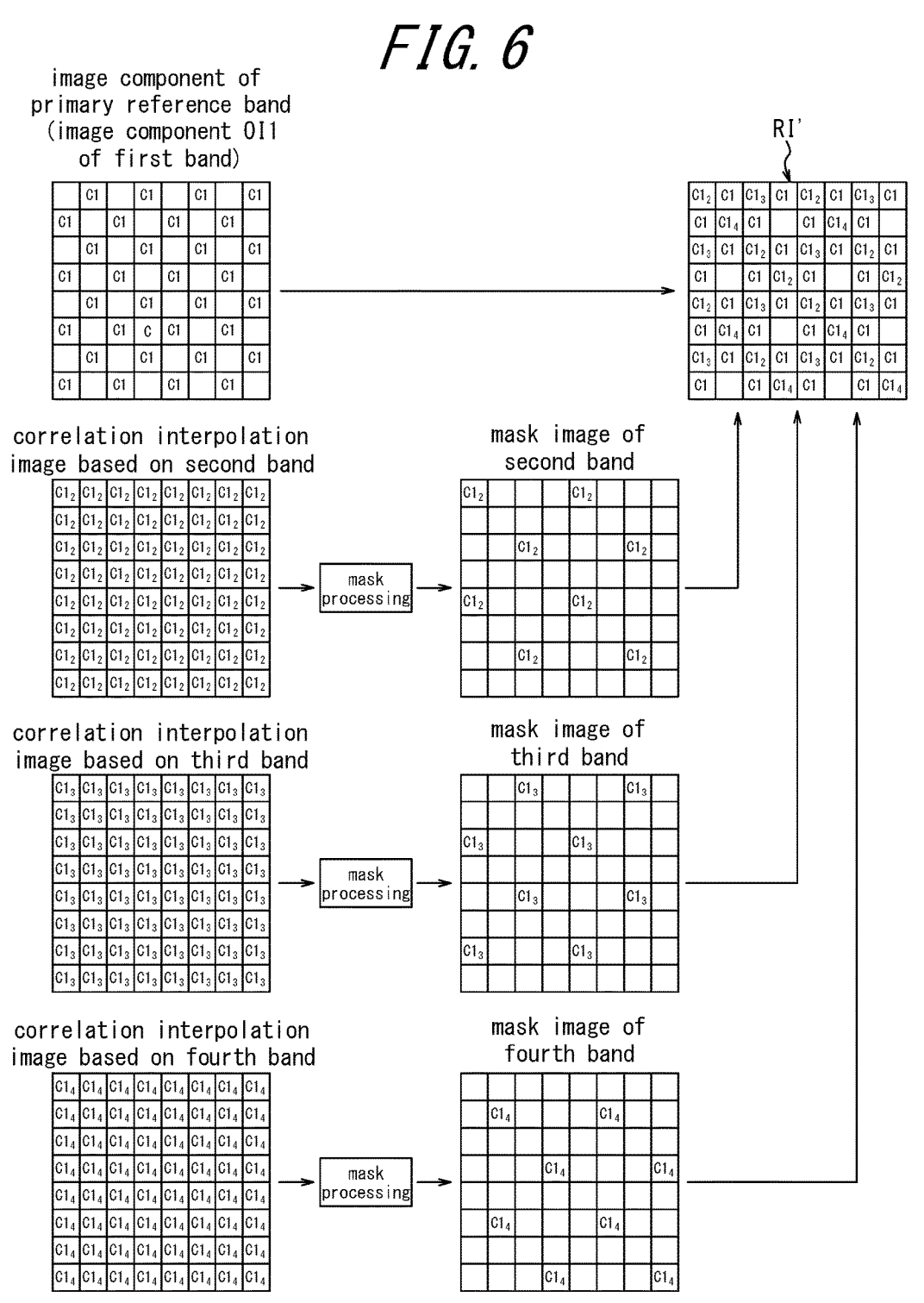

The reference image generation part 17 also generates, in the third band and the fourth band, a correlation interpolation image based on the third band and a correlation interpolation image of the third band, through a process similar to that for the second band. Further, as illustrated in FIG. 6, the reference image generation part 17 subjects the correlation interpolation image based on the second band to mask processing of deleting the pixel values at the pixel positions of the missing pixels mp in the image component OI2 of the second band, to thereby generate a mask image of the second band. Similarly, the reference image generation part 17 generates a mask image of the third band and a mask image of the fourth band. Further, the reference image generation part 17 superposes the mask image of the second band, the mask image of the third band, and the mask image of the fourth band, on the image component of the primary reference band (the image component OI1 of the first band), to thereby interpolate some of the missing pixels mp in the image component of the primary reference band (see the symbol "RI'").

Next, by taking the image component OI5 of the fifth band as an example, description is given of interpolation of the image component of the primary reference band (the image component OI1 of the first band) relative to the pixel position where the image component of a band determined as lower correlation has a pixel value. The reference image generation part 17 calculates, at the pixel position p5 where the image component OI5 of the fifth band has a pixel value, an interpolation value at the pixel position in the image component of the primary reference band (the image component OI1 of the first band), using the correlation with the image component of at least one of the bands determined as being of high correlation.

For example, the reference image generation part 17 calculates an interpolation value for the pixel position p5 where the image component OI5 of the fifth band has a pixel value, using at least any of the pixel values in the correlation interpolation image by the aforementioned second band, the correlation interpolation image based on the third band, and the correlation interpolation image of the fourth band. Conceivable examples of the interpolation values may include, for example, a simple mean value, a weighted mean value, and any one of the pixel values selected, of the pixel values in the correlation interpolation image of the second band, the correlation interpolation image of the third band, and the correlation interpolation image of the fourth band.

The weighted mean and the pixel values may be selected based on, for example, how high the correlation with the image component of the primary reference band (the image component OI1 of the first band) and how close to the pixel position p5 where the image component OI5 of the fifth band has a pixel value. For example, in the case where, for example, the image component OI3 of the third band has the highest correlation with the image component of the primary reference band (the image component OI1 of the first band), the pixel values of the correlation interpolation image based on the third band may be largely weighted or the pixel values may be used as the interpolation values. Further, the image component OI2 of the second band and the image component OI3 of the third band have pixel values at a position closest to the pixel position p5 where the image component OI5 of the fifth band has a pixel value. Thus, the pixel values of the correlation interpolation image based on the second band and the correlation interpolation image based on the third band may be largely weighted, or the mean value of the pixel values of both bands may be used as the interpolation value.

Further, for example, the reference image generation part 17 may calculate an interpolation value at the pixel position p5 where the image component OI5 of the fifth band has a pixel value, through interpolation process using at least one of the pixel values of pixels constituting the image component of the primary reference band (the image component OI1 of the first band) and the interpolation value calculated based on the correlation with the image component of at least one band determined as being of high correlation. For example, the reference image generation part 17 may use missing pixels mp in an image RI' obtained by superposing the mask image of the second band, the mask image of the third band, and the mask image of the fourth band, on the image component of the primary reference band (the image component OI1 of the first band), that is, the peripheral pixels of the pixels at the pixel position p5 where the image component OI5 of the fifth band has a pixel value, to calculate the interpolation value using, for example, bi-linear interpolation and bi-cubic interpolation.

The reference image generation part 17 interpolates the missing pixels mp in the image component of the primary reference band (the image component OI1 of the first band) through the aforementioned process to generate a primary reference image, and transmits the resulting image to the interpolation image generation part 18.

The interpolation image generation part 18 uses the correlation determination result determined by the correlation determination part 16 and the primary reference image generated by the reference image generation part 17 to interpolate the missing pixels mp in the image components of at least some of the bands other than the primary reference band. More specifically, the interpolation image generation part 18 uses the primary reference image to interpolate the missing pixels mp in each of the image components of bands, namely, the image component OI2 of the second band, the image component OI3 of the third band, and the image component OI4 of the fourth band, which are determined in this embodiment as being of high correlation with the image component of the primary reference band (the image component OI1 of the first band). Examples of processing applicable to the pixel interpolation in the image components of other bands using the primary reference image may include, for example, the aforementioned guided filter processing or joint bilateral processing.

Meanwhile, the interpolation image generation part 18 interpolates the missing pixels mp in the image component of a band determined as being of low correlation with the image component of the primary reference band (the image component OI1 of the first band), namely, the image component OI5 of the fifth band in this embodiment, through bi-linear interpolation and bi-cubic interpolation using the image component OI5 of the fifth band, without using the primary reference image.

The interpolation image generation part 18 transits the primary reference image and interpolation images of the image components of other bands where the missing pixels mp are interpolated, that is, an image having pixel values in all the pixels in each band, to a monitor and a storage medium compatible with multi-band.

Figure 7:
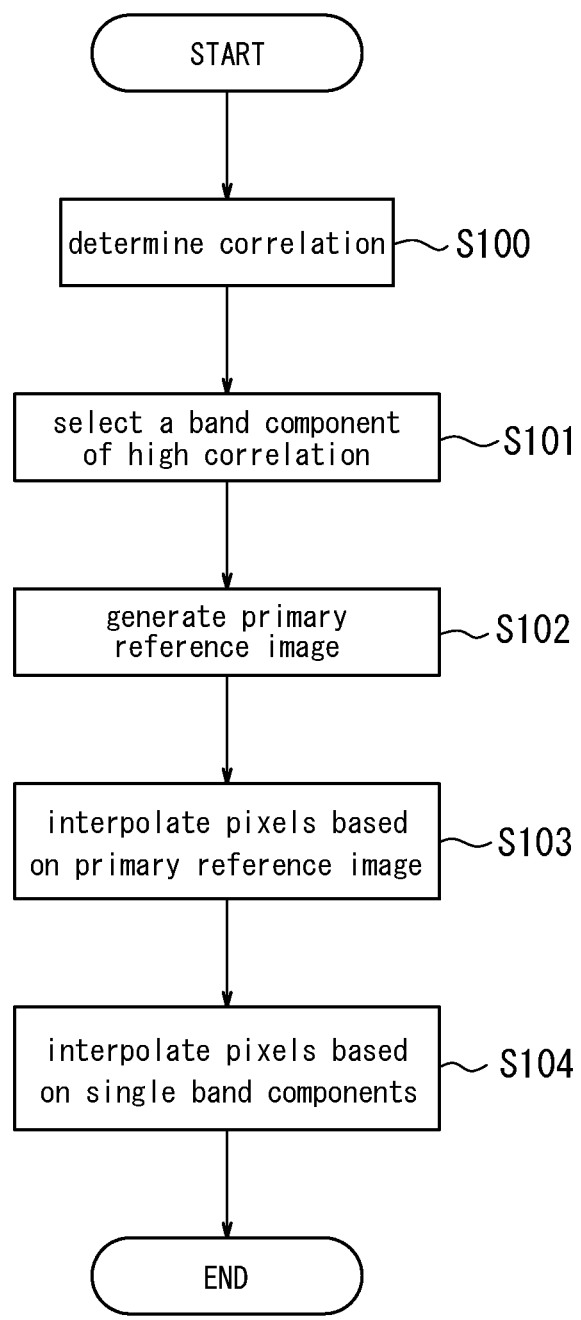
FIG. 7 is a flow chart for illustrating an image interpolation process executed by the image processing unit of FIG. 1.

Next, an image interpolation process to be executed by the image processing unit 12 is described with reference to the flowchart of FIG. 7. The image interpolation process is started when the image processing unit 12 obtains an original image OI from the imaging section 11.

In Step S100, the image processing unit 12 determines correlation between the image component of the primary reference band and the image components of the other bands. In determining correlation, the image processing unit 12 also classifies the correlation as being either of high correlation or low correlation. Once the correlation is determined, the process proceeds to Step S101.

In Step S101, the image processing unit 12 selects an image component of the band determined in Step S100 as being of high correlation. Once the image component of the band are selected, the process proceeds to Step S102.

In Step S102, the image processing unit 12 uses the image component of the band selected in Step S101 to interpolate the missing pixels mp in the image component of the primary reference band, to thereby generate a primary reference image. Once the primary reference image is generated, the process proceeds to Step S103.

In Step S103, the image processing unit 12 interpolates, with reference to the correlation based on the primary reference image, the missing pixels mp in the image component of the band determined as being of high correlation in Step S100. After the pixel interpolation based on the primary reference image, the process proceeds to Step S104.

In Step S104, the image processing unit 12 interpolates the missing pixels mp in the image component of a band determined as being of low correlation in Step S100, through bi-linear interpolation and bi-cubic interpolation using the peripheral pixels of the image component of the band. After the interpolation, the image interpolation process is ended.

According to the image processing unit of this embodiment configured as described above, the primary reference image is generated, with respect to the original image OI generated by the image sensor 14 having a multi-band filter array, using the image components of other bands based on the determination result as to the correlation with the image component of the primary reference band, which allows the sense of resolution of the primary reference image to be improved as compared with a case where the image component of the primary reference band is used alone to generate the primary reference image. Accordingly, the interpolation image of each band, in which the missing pixels mp in the image components of the other bands are interpolated using the primary reference image, may be improved in the sense of resolution.

Further, according to the image processing unit of this embodiment, the image component of the band determined as being of low correlation relative to the image component of the primary reference band is interpolated within the image component of the band without using the primary reference image, which suppresses the generation of moire in the interpolation image of the image component of the band.

Further, according to the image processing unit of this embodiment, a residual image is interpolated to generate a correlation interpolation image, which suppresses generation of moire in the primary reference image containing less high-frequency components, as compared with a configuration of directly generating the primary reference image based on the correlation primary interpolation image.

The present disclosure has been explained with reference to the drawings and embodiments, which however may be subjected to various modifications and alterations by a person skilled in the art based on the disclosure. Thus, it should be noted that such alterations and modifications are included in the scope of the disclosure.

For example, the correlation information, which is defined in advance in this embodiment, may be configured to be calculated from the original image OI obtained by the image processing unit 12. For example, the image processing unit 12 may estimate, based on, for example, the entire luminance of the original image signal and the ratio of the pixel value for each image component of the band, the imaging conditions from among a plurality of imaging scenes such as a portrait mode and a landscape mode that can be assumed in advance, and may determine, based on the correlation of the image components of bands in each statistically-defined imaging scene, the correlation of the image components of respective bands with the image component of the primary reference band.

Alternatively, for example, the image component of the primary reference band in the original image OI may be compared with the sum total, the mean value, the variance, the maximum value, and the median of the pixel values for the respective image components of the other bands, to thereby determine the correlation. The correlation is higher as the difference is smaller between those values in the image component of the primary reference band and those values in the image components of the other band, and the correlation may be compared with, for example, a threshold value so as to be classified into either of high correlation and low correlation. This configuration eliminates the need for analyzing in advance data on a plurality of arbitrary images.

Further, the correlation may be determined based on, for example, a difference between the interpolated value of the image component of the primary reference band interpolated through guided filter processing using pixel values constituting the image component of a band other than the primary reference band and the pixel value constituting the image component of the primary reference band, i.e., the pixel value of the residual image of FIG. 5. The correlation is higher as the difference is smaller, and the correlation may be compared with, for example, a threshold value so as to be classified into either high correlation or low correlation. This configuration may eliminate the need for analyzing arbitrary data on a plurality of images.

Further, the correlation determination part 16, which is configured in this embodiment to determine the correlation between the image component of the primary reference band and the image components of other bands in the entire image, may determine the correlation for each partial region obtained by dividing the entire region. This configuration is properly adaptable to the correlation between the image component of the primary reference band and the image components of the other bands which may vary depending on the spectral characteristics of the light source under an exemplary imaging condition of illuminating the object with a plurality of light sources.

Figure 8:
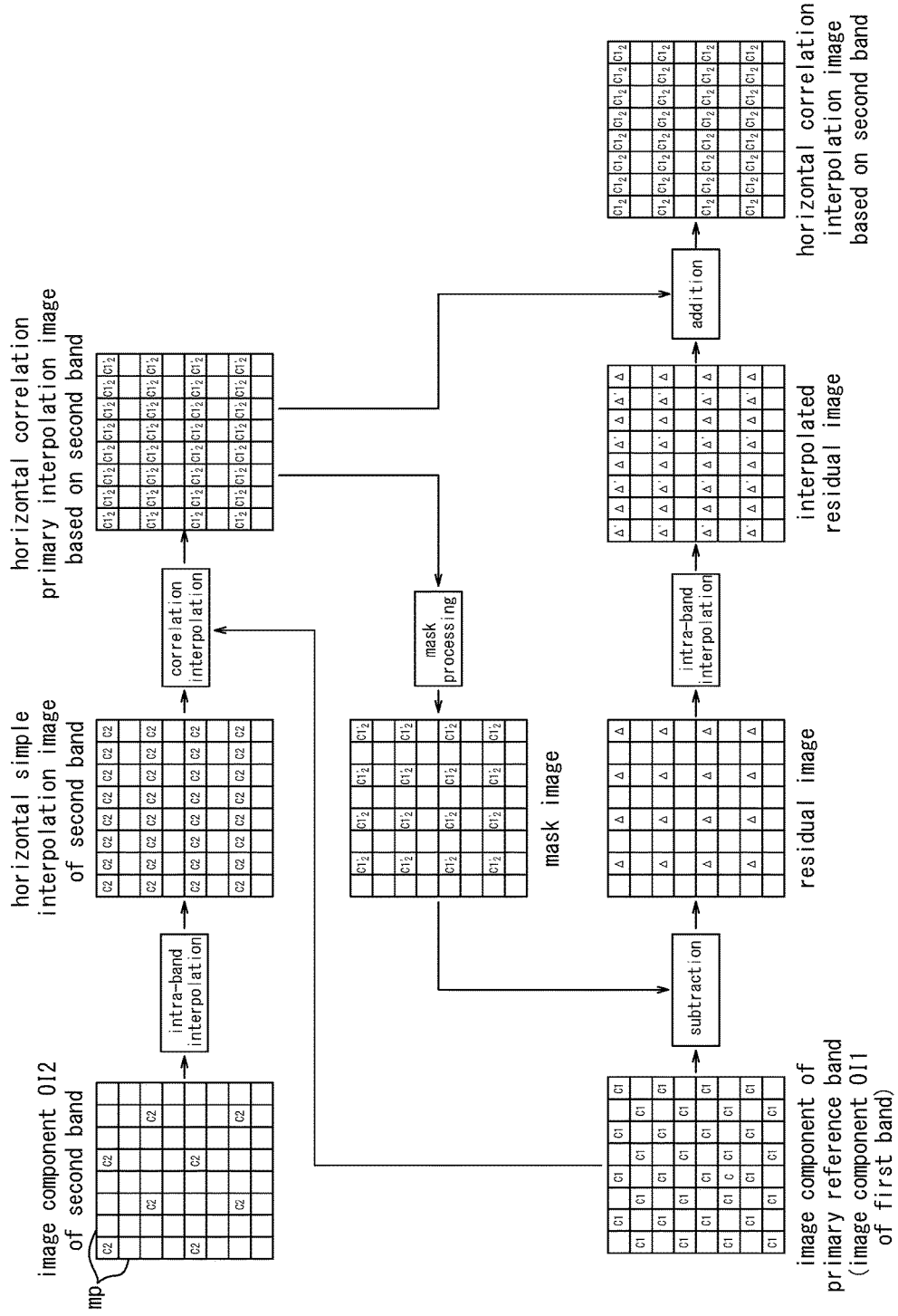
FIG. 8 is a process diagram showing processes of generating a horizontal correlation interpolation image based on the second band, executed by a modified example of the reference image generation part of FIG. 1.
Figure 9:
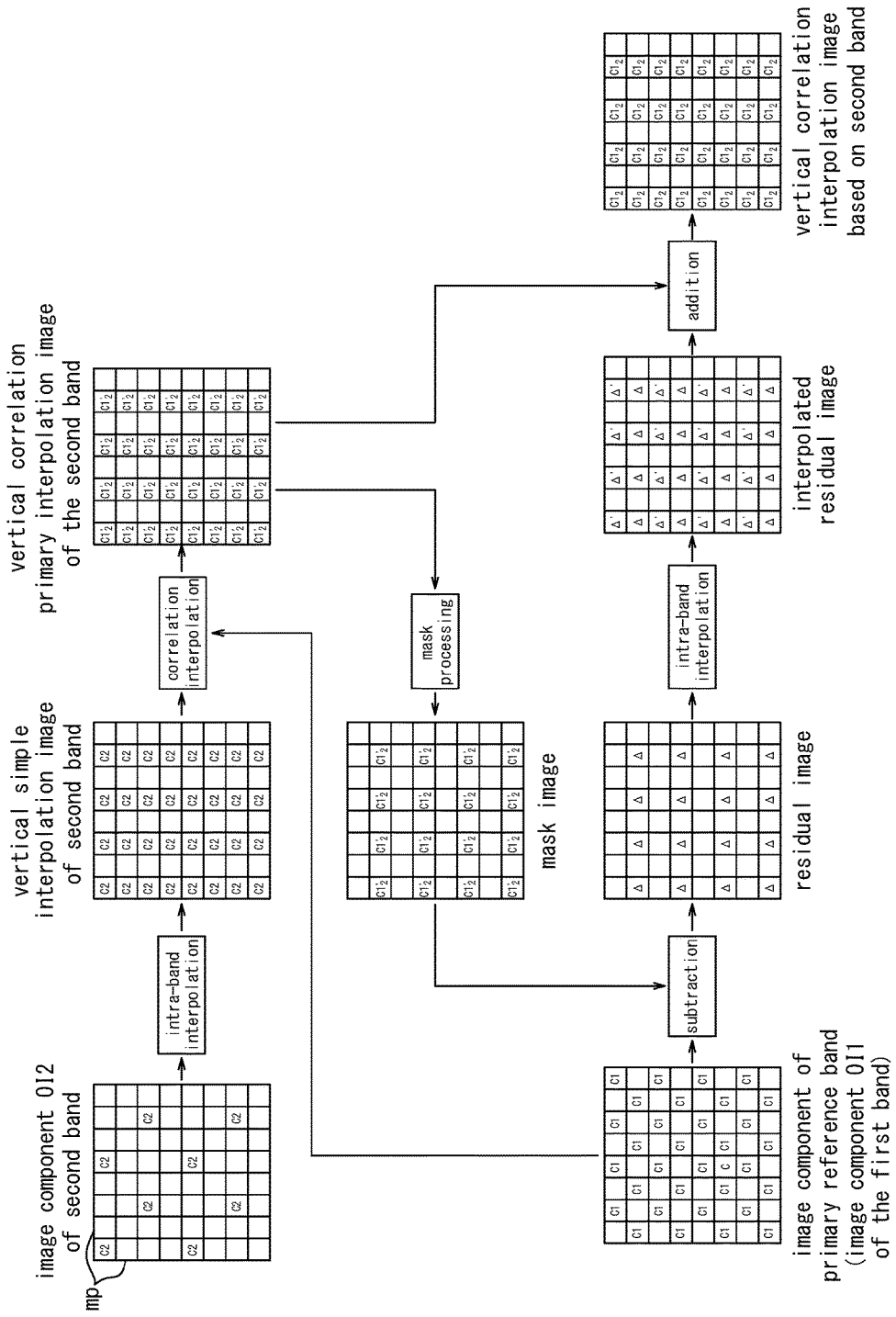
FIG. 9 is a process diagram showing processes of generating a vertical correlation interpolation image based on the second band, executed by a modified example of the reference image generation part of FIG. 1.

Further, in this embodiment, the reference image generation part 17 is configured to interpolate all the missing pixels mp of the image component determined as being of high correlation (see 'intra-band interpolation' in the upper level of FIG. 5) to generate a correlation primary interpolation image. Here, the missing pixels mp in the image component of the band may be interpolated for each direction to generate correlation interpolation images in the horizontal direction and vertical direction (see FIGS. 8, 9). The pixel values generated through the interpolation for each direction may be averaged with weight, to thereby generate a correlation interpolation image based on the image component of the band. Such interpolation for each direction may improve accuracy of the interpolation, to thereby further improve the sense of resolution of the primary reference image.

Further, this embodiment is configured to use the primary reference image for interpolating the image components of all the bands determined as being of high correlation with respect to the image component of the primary reference band. Instead, however, the secondary reference image may be used as described in below depending on the correlation, to thereby interpolate the image components of the bands. For example, when the image component of the primary reference band (the image component OI1 of the first band) has high correlation with the image component OI2 of the second band and the image component OI3 of the third band, and the image component OI2 of the second band has high correlation with the image component OI3 of the third band, the image component OI2 of the second band may have higher correlation with the image component of the primary reference band (the image component OI1 of the first band). In such case, the primary reference image may be used to interpolate the missing pixels mp of the image component OI2 of the second band, and the interpolation image component OI2 of the second band may be used as the secondary reference image to interpolate the missing pixels mp of the image component OI3 of the third band. This configuration allows for obtaining an interpolation image with higher sense of resolution in the image components of the respective bands.

Further, in this embodiment, the image component of one of the bands are determined as being of low correlation with respect to the image component of the primary reference band; however, the image components of all the bands may of course be determined as being of high correlation with respect to the image component of the primary reference band. When the image components of all the bands are determined as being of high correlation, the primary reference image is generated using the image components of all the bands.

Figure 10:
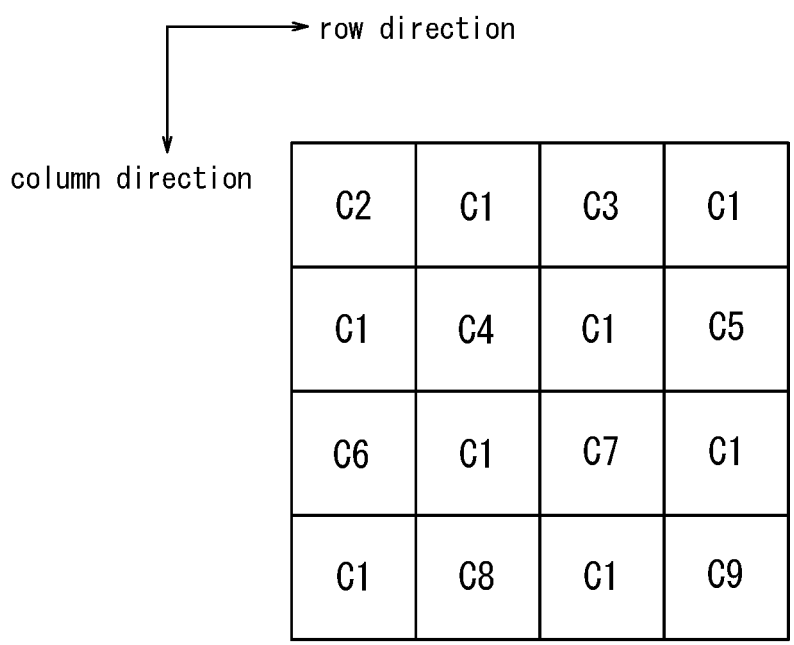
FIG. 10 is a layout of filters in filter repeating units in a filter array of a first modified example of the image sensor of FIG. 1.
Figure 11:
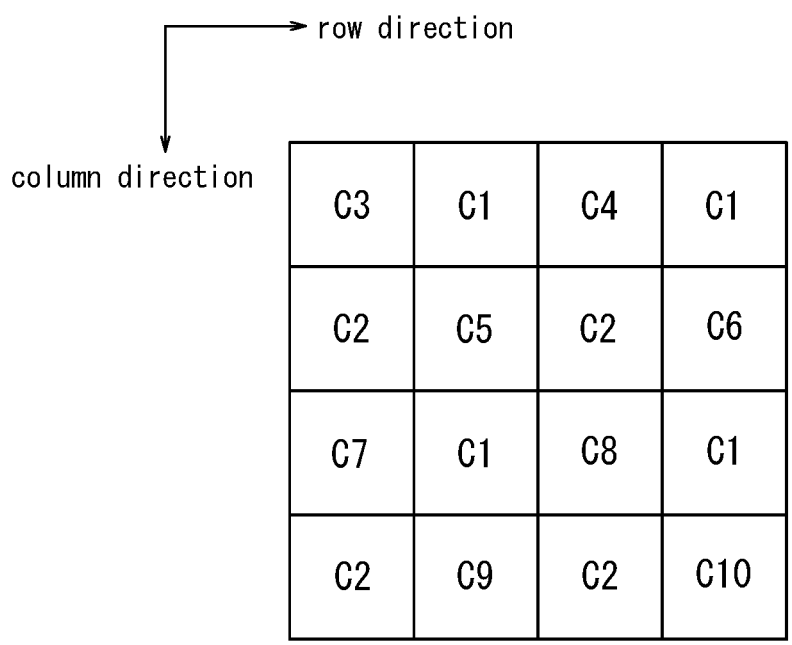
FIG. 11 is a layout of filters in filter repeating units in a filter array of a second modified example of the image sensor of FIG. 1.

Further, the image sensor 14, which includes a filter array of five bands in this embodiment, may have a filter array of 9 bands or 10 bands as illustrated in FIGS. 10, 11.

Further, the image processing unit 12, which is incorporated in the imaging device 10 in this embodiment, may be implemented as, for example, an image processing device configured as software in a personal computer.

REFERENCE SIGNS LIST 10 imaging device
11 imaging section
12 image processing unit
13 optical system
14 image sensor
15 image acquisition part
16 correlation determination part
17 reference image generation part
18 interpolation image generation part
C1 to C5 first filter to fifth filter
mp missing pixel
OI original image
OI1 to OI5 first band image component to fifth band image component
p2 to p5 pixel positions where second band image component to fifth band image component each have a pixel value
RI' image obtained by superposing the mask image of the second band to the mask image of the fourth band, on the image component of the primary reference band

The invention claimed is:

1. An image processing unit comprising:
   an image acquisition part that acquires an original image captured by an image sensor having a multi-band filter array including filters of four or more bands arranged in an array, the filters including a filter of a primary reference band as an arbitrary band; and
   a processor that determines whether correlation of an image component of the primary reference band with image components of respective bands other than the primary reference band is either of high correlation or low correlation; that interpolates missing pixels in the image component of the primary reference band by switching an interpolation method based on a correlation determination result obtained by the processor, to thereby generate a primary reference image; and that interpolates missing pixels in at least part of the image components of respective bands other than the primary reference band, using the correlation determination result and the primary reference image,
   wherein the processor uses an image component of at least one band determined as being of high correlation to interpolate missing pixels in the image component of the primary reference band, and calculates, at a pixel position where the image component of the band determined as being of high correlation each have a pixel value, an interpolated value of the pixel position in the image component of the primary reference band using the correlation with the image component of the band.

2. The image processing unit according to claim 1, wherein
   the processor calculates, at a pixel position where an image component of a band determined as being of the low correlation each have a pixel value, an interpolated value of the pixel position in the image component of the primary reference band, using the correlation with an image component of at least one band determined as being of high correlation.

3. The image processing unit according to claim 2, wherein
   the processor calculates, at a pixel position where the image component of a band determined as being of the low correlation each have a pixel value, a plurality of interpolated values at the pixel position in the image component of the primary reference band, using the correlation with respective image components of a plurality of bands determined as being of the high correlation, and calculates the weighted mean value of the plurality of interpolated values as the interpolated value at the pixel position in the image component of the primary reference band.

4. The image processing unit according to claim 2, wherein
the processor calculates, at a pixel position where the image component of a band determined as being of the low correlation each have a pixel value, an interpolated value of the pixel position in the image component of the primary reference band, using the correlation with an image component of a single band determined as being of the high correlation.

5. The image processing unit according to claim 2, wherein
the processor calculates, at a pixel position where the image component of a band determined as being of the low correlation each have a pixel value, an interpolated value of the pixel position in the image component of the primary reference band, through interpolation process using at least one of the pixel values constituting the image component of the primary reference band other than the pixel position and the interpolated value calculated based on the correlation with the image component of at least one band determined as being of the high correlation.

6. The image processing unit according to claim 1, wherein
the processor calculates interpolated values of the image component of the primary reference band for each direction.

7. The image processing unit according to claim 1, wherein
the processor determines, based on correlation information defined in advance, whether the correlation is either of high correlation or low correlation.

8. The image processing unit according to claim 7, wherein
the correlation information is defined in advance based on one of: analysis of data on plurality of arbitrary images and a spectral sensitivity characteristic of the multi-band filter array.

9. The image processing unit according to claim 1, wherein
the processor generates correlation information based on the original image and determines, based on the correlation information, whether the correlation is either of high correlation or low correlation.

10. The image processing unit according to claim 9, wherein
the correlation information comprises imaging scenes determined based on the original image.

11. The image processing unit according to claim 9, wherein
the correlation information is calculated from either: a difference of the sum total, the mean value, the variance, the maximum value, and the median of the pixel values between image components of bands constituting the original image; or a difference between the interpolated value of the image component of the primary reference band based on a pixel value constituting an image component of a band other than the primary reference band and a pixel value constituting the image component of the primary reference band.

12. The image processing unit according to claim 9, wherein
the processor generates the correlation information for each of partial regions obtained by dividing the original image into a plurality of regions, and determines, for each of the partial regions, whether the correlation is either of high correlation or low correlation.

13. The image processing unit according to claim 1, wherein
the processor uses the primary reference image to interpolate missing pixels in an image component of a band determined as being of the high correlation.

14. The image processing unit according to claim 1, wherein
the processor interpolates missing pixels in an image component of a band, among image components of a plurality of bands determined as being of the high correlation, the band having lower correlation with the image component of the primary reference band than with image components of other bands while having correlation with the image components of the other bands, by using, as a secondary reference image, an interpolation image obtained by interpolating missing pixels in the image components of the other bands.

15. The image processing unit according to claim 1, wherein
the processor interpolates missing pixels in an image component of the band determined as being of the low correlation, using the image component of the band.

16. An imaging device comprising:
an image sensor that has a multi-band filter array having filters of four or more bands arranged in an array, the filters including a filter of a primary reference band as an arbitrary band;
a processor that determines whether correlation of an original image captured by the image sensor with an image component of a primary reference band and with image components of respective bands other than the primary reference band is either of high correlation or low correlation; that interpolates missing pixels in the image component of the primary reference band by switching an interpolation method based on a correlation determination result obtained by the processor, to thereby generate a primary reference image; and that interpolates missing pixels in at least some of the image components of respective bands other than the primary reference band, using the correlation determination result and the primary reference image,
wherein the processor uses an image component of at least one band determined as being of high correlation to interpolate missing pixels in the image component of the primary reference band, and calculates, at a pixel position where the image component of the band determined as being of high correlation each have a pixel value, an interpolated value of the pixel position in the image component of the primary reference band using the correlation with the image component of the band.

17. A non-transitory computer-readable medium storing an image processing program causing a computer to
determine whether correlation of an original image captured by an image sensor with an image component of a primary reference band and with image components of respective bands other than the primary reference band is either of high correlation or low correlation, the image sensor having a multi-band filter array having filters of four or more bands arranged in an array, the filters including a filter of a primary reference band as an arbitrary band;
interpolate missing pixels in the image component of the primary reference band by switching an interpolation method based on whether the correlation is either of high correlation or low correlation, to thereby generate a primary reference image, wherein an image component of at least one band determined as being of high correlation is used to interpolate missing pixels in the image component of the primary reference band, and wherein, at a pixel position where the image component of the band determined as being of high correlation each have a pixel value, an interpolated value of the pixel position in the image component of the primary reference band is calculated using the correlation with the image component of the band; and
interpolate missing pixels in at least some of the image components of respective bands other than the primary reference band, using the correlation determination result and the primary reference image.

\* \* \* \* \*